US006873389B2

(12) United States Patent
Ikeya et al.

(10) Patent No.: US 6,873,389 B2
(45) Date of Patent: Mar. 29, 2005

(54) FLAT DISPLAY PANELS AND HAVING A VENTILATION DUCT SECURED TO A BACK SUBSTRATE VIA A SEALING MEMBER, AND METHODS OF MANUFACTURING THE SAME

(75) Inventors: Tomoyoshi Ikeya, Shizuoka-ken (JP); Yoshihiro Nakajima, Shizuoka-ken (JP)

(73) Assignees: Pioneer Corporation, Tokyo (JP); Pioneer Display Products Corporation, Fukurio (JP)

( * ) Notice: Subject to any disclaimer, the term of this patent is extended or adjusted under 35 U.S.C. 154(b) by 29 days.

(21) Appl. No.: 10/454,508

(22) Filed: Jun. 5, 2003

(65) Prior Publication Data

US 2003/0227252 A1 Dec. 11, 2003

(30) Foreign Application Priority Data

Jun. 7, 2002 (JP) ....................................... 2002-167073

(51) Int. Cl.[7] ..................... G02F 1/1339; G02F 1/1333; H01J 1/62; H01J 9/32

(52) U.S. Cl. ......................... 349/153; 349/84; 349/190; 313/493; 445/25

(58) Field of Search .......................... 349/84, 153, 187, 349/190; 445/24, 25; 313/493

(56) References Cited

U.S. PATENT DOCUMENTS

| | | | | | |
|---|---|---|---|---|---|
| 5,797,780 | A | * | 8/1998 | Peng | 445/25 |
| 6,007,397 | A | * | 12/1999 | Ju et al. | 445/25 |
| 6,257,945 | B1 | * | 7/2001 | Nakayama | 445/25 |
| 6,261,145 | B1 | * | 7/2001 | Lee et al. | 445/25 |
| 6,459,198 | B1 | * | 10/2002 | Dean et al. | 313/493 |

* cited by examiner

*Primary Examiner*—Tarifur R. Chowdhury
(74) *Attorney, Agent, or Firm*—Arent Fox PLLC

(57) ABSTRACT

A flat display panel has a ventilation hole formed in a back glass substrate facing a front glass substrate with a space in between, and provides communication between the space and the exterior. A ventilation duct is connected to the ventilation hole and secured with a pressed frit to the outer face of the back glass substrate. The ventilation duct has a flange formed at one end thereof connected with the back glass substrate. The pressed frit having a ventilation hole is sandwiched between the flange and the back glass substrate, and fused to the flange and the back glass substrate in order for the ventilation duct to be secured to the back glass substrate.

5 Claims, 3 Drawing Sheets

FLAT DISPLAY PANELS AND HAVING A VENTILATION DUCT SECURED TO A BACK SUBSTRATE VIA A SEALING MEMBER, AND METHODS OF MANUFACTURING THE SAME

BACKGROUND OF THE INVENTION

1. Field of the Invention

This invention relates to structure of a flat display panel and a method of manufacturing the flat display panel.

The present application claims priority from Japanese Application No. 2002-167073, the disclosure of which is incorporated herein by reference.

2. Description of the Related Art

In the manufacturing process for flat display panels which cause light emission in the space defined between two substrates for generation of a display image, such as plasma display panels (hereinafter referred to as "PDP"), field emission display (FED) panels and the like, a process for exhausting air from the space between the two substrates is typically required in order to produce a vacuum inside the space defined between the two substrates in which light emission is carried out, and/or to keep the space in the state of being filled with a discharge gas.

FIG. 1 illustrates a conventional structure for exhausting air from the space between the two substrates of such a flat display panel.

FIG. 1 shows a front glass substrate 1 constituting the display screen of the flat display panel, and a back glass substrate 2 constituting the back part of the flat display panel.

The flat display panel has the front glass substrate 1 and the back glass substrate 2 facing each other at a predetermined interval. A space S thus defined between the glass substrates 1 and 2 is sealed by a sealing layer 3 formed on the peripheral edge between the front glass substrate 1 and the back glass substrate 2.

A ventilation hole 2A is formed for establishing communication between the space S and the outside in a position on the inner portion of the back glass substrate 2 close to the sealing layer 3.

A ventilation duct 4 is placed coaxially with the ventilation hole 2A on the outside surface of the back glass substrate 2. A seal between an end of the ventilation duct 4 and the ventilation hole 2A is provided by a pressed frit 5. The pressed frit 5 is made of a frit paste (sealing materials) essentially consisting of low-melting glass powders, and formed around the opening of the ventilation hole 2A on the back glass substrate 2.

In the prior art, as illustrated in FIG. 1, the flat display panel with the front glass substrate 1 facing downward is supported from beneath by supporting arms M, and then the ventilation duct 4 is mounted on the back glass substrate 2 from above.

Then, the exhaustion of air from the space S formed between the front glass substrate 1 and the back glass substrate 2, and the infusion of the discharge gas into the space S in the case of PDPs, are carried out via the ventilation hole 2A from the ventilation duct 4 mounted on the back glass substrate 2 as described above. After completion of the exhaustion of air and/or the infusion of the discharge gas, the opening of the ventilation duct 4 is sealed to make the space S airtight.

As described above, the flat display panel is supported with the front glass substrate 1 facing downward and the ventilation duct 4 is mounted on the back glass substrate 2 from above. This is because of prevention of imperfect attaching and sealing. If the ventilation duct 4 is mounted on the back glass substrate 2 from beneath while the flat display panel with the back glass substrate 2 facing downward is supported, in the process of forming the pressed frit 5 between the end of the ventilation duct 4 and the ventilation hole 2A by use of the frit paste, the frit paste may run to other unrelated parts and adhere thereto, and the pressed frit 5 may not be formed in a predetermined shape, leading to the imperfect attaching and sealing.

However, the fact that the front glass substrate 1 is placed so that its front surface points downward and supported by the supported arms M in the process of mounting the ventilation duct 4 on the back glass substrate 2 as done in the foregoing conventional manufacturing method, gives rise to the problem of producing scratches or stains on the front glass substrate 1 which serves as the display screen for images.

SUMMARY OF THE INVENTION

The present invention has been made to solve the problem associated with the manufacturing process of the flat display panels in the prior art as described above.

It is therefore a first object of the present invention to provide a flat display panel capable of being manufactured without giving scratches or stains on a display screen of the panel and also having a ventilation duct completely sealed thereto.

It is a second object of the present invention to provide a method of manufacturing flat display panels which is capable of attaching a ventilation duct with complete sealing and further with giving no scratches or stains on a display screen of the panel.

To attain the above first object, a flat display panel according to the present invention includes a ventilation hole which is formed in a first substrate of two first and second substrates facing each other at a predetermined interval and provides communication between the space defined between the first and second substrates and the outside, and the flat display panel is characterized by including a sealing member having a central hole, and a ventilation duct which is connected to the ventilation hole and secured with the sealing member onto an outer face of the first substrate and includes a flange formed at one end of the ventilation duct connected to the first substrate, and in that the sealing member is sandwiched between the flange and the first substrate, and fused to both the flange and the first substrate to secure the ventilation duct to the first substrate.

To attain the second object, a method of manufacturing flat display panels according to the present invention is characterized by including the steps of: horizontally supporting the panel, constituted of two substrates facing each other at a required interval, with one of the substrates, having a ventilation hole formed therein to provide communication between the exterior and a space defined between the two substrates, facing downward; preparing a ventilation duct having a flange formed on one end, and a sealing member having a central hole passing therethrough; placing the sealing member in a position connecting the central hole with the ventilation hole opening on the underside of the substrate to sandwich the sealing member between the flange and the underside of the substrate and to align the ventilation duct approximately coaxially with the ventilation hole; and heating the sealing member sandwiched between the flange of the ventilation duct and the underside of the substrate to fuse the sealing member to the flange of the ventilation duct and the underside of the substrate for securing the ventilation duct to the underside of the substrate.

These and other objects and features of the present invention will become more apparent from the following detailed description with reference to the accompanying drawings.

DETAILED DESCRIPTION OF THE PREFERRED EMBODIMENT

A preferred embodiment according to the present invention will be described hereinafter in detail with reference to the accompanying drawings.

Figure 1:
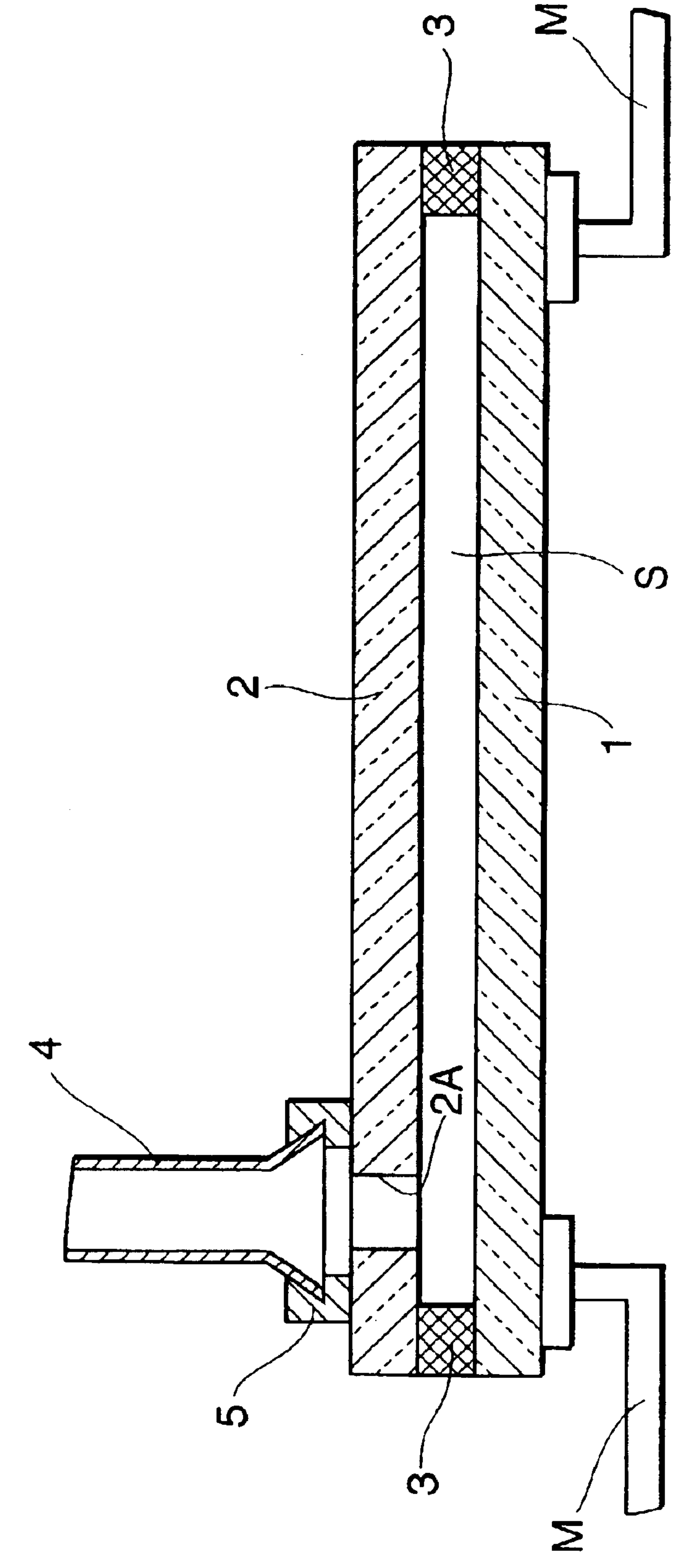
Fig. 1 PRIOR ART
FIG. 1 is a sectional side view illustrating an example of the prior art.
Figure 2:
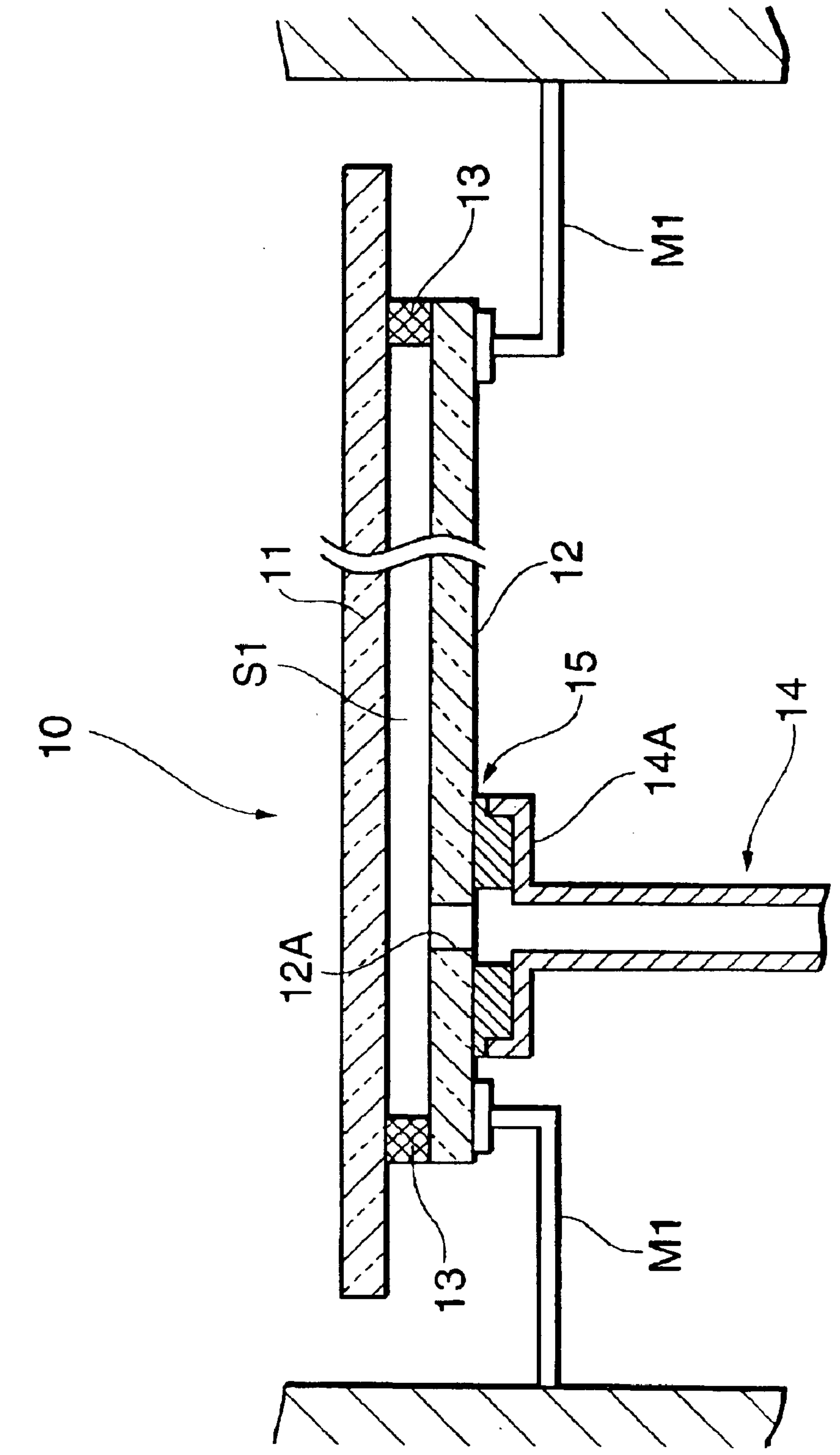
FIG. 2 is a sectional side view illustrating an embodiment according to the present invention.

FIG. 2 is a sectional side view illustrating a flat display panel under the manufacturing process in an embodiment according to the present invention.

In FIG. 2, a flat display panel 10 such as a plasma display panel (PDP), a field emission display (FED) panel, or the like has a front glass substrate 11 and a back glass substrate 12 facing each other at a predetermined interval. A space S1 thus defined between the glass substrates 11 and 12 is sealed by a sealing layer 13 formed on the peripheral edge between the front glass substrate 11 and the back glass substrate 12.

A ventilation hole 12A is formed in the inner portion of the back glass substrate 12 close to the sealing layer 13 and opposite the non-display area, and establishes communication between the space S1 and the outside.

Figure 3:
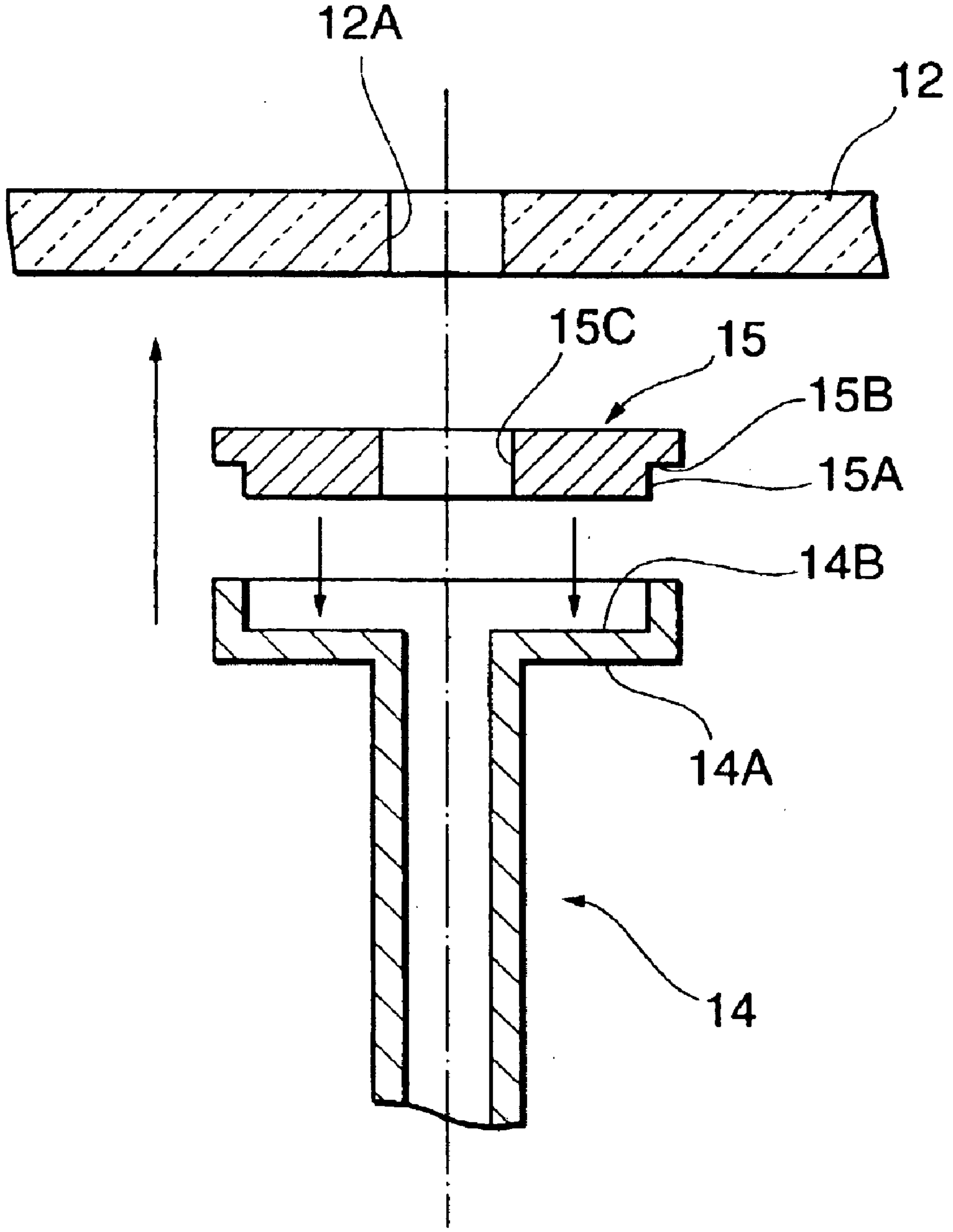
FIG. 3 is an enlarged view illustrating a process in the manufacturing process in the embodiment.

A ventilation duct 14 is mounted on the back glass substrate 12 so as to communicate with the ventilation hole 12A. As illustrated in the enlarged view in FIG. 3, the ventilation duct 14 has a flange 14A integrally formed at the end of the ventilation duct 14 attached to the back glass substrate 12, and a recess 14B formed on the face of the flange 14A facing the back glass substrate 12.

A pressed frit 15 providing an airtight seal between the ventilation duct 14 and the back glass substrate 12 is formed of amorphous or crystalline low-melting glass powders (frit) and has a cylindrical part ISA which fits into the recess 14B of the ventilation duct 14, a flange 15B integrally formed on a part of the outer peripheral face of the cylindrical part 15A opposing to the back glass substrate 12, and a ventilation hole 15C formed at the center of the pressed frit 15.

As illustrated in FIG. 2, the front glass substrate 11 and the back glass substrate 12 which are placed opposite to each other at a predetermined interval to define the space S1 sealed by the sealing layer 13, are horizontally supported by supporting arms M1 with the back glass substrate 12 facing downward. In this situation, the ventilation duct 14 and the pressed frit 15 are attached from beneath in an area including the ventilation hole 12A of the back glass substrate 12.

Specifically, in the attachment of the ventilation duct 14, first, the pressed frit 15 pre-formed in the shape as described above is attached to the connecting end of the ventilation duct 14 by fitting the cylindrical part 15A into the recess 14B of the ventilation duct 14.

Then, the ventilation duct 14 with the pressed frit 15 is moved to the underside of the back glass substrate 12, and then adjusted in position such that the ventilation duct 14 and the ventilation hole 15C of the pressed frit 15 are aligned coaxially with the ventilation hole 12A of the back glass substrate 12. Then, the flange 15B of the pressed frit 15 is applied to the underside of the back glass substrate 12.

After that, the pressed frit 15 is heated until its surface melts, so that the pressed frit 15 is fused to both the back glass substrate 12 and the ventilation duct 14. As a result, by forming a seal between the ventilation duct 14 and the ventilation hole 12A, the ventilation duct 14 is secured to the back glass substrate 12.

At this point, the melted frit paste flowing out from the surface of the pressed frit 15 as a result of the heating, is received by the flange 14A of the ventilation duct 14, so that the frit paste does not run to an unrelated area and the pressed frit 15 is not largely deformed by a spill of the frit paste, leading to prevention of impairment of the sealing capability between the ventilation hole 12A and the ventilation duct 14.

After the ventilation duct 14 is attached to the back glass substrate 12 as described above, the air inside the space S1 between the front glass substrate 11 and the back glass substrate 12 is exhausted from the space S1 via the ventilation hole 12A of the back glass substrate 12, the ventilation hole 15C of the pressed frit 15, and then the ventilation duct 14. Then, a discharge gas is infused into the space S1 in inverse order if the flat display panel is a plasma display panel.

In the embodiment, the recess 14B is formed in the flange 14A of the ventilation duct 14, and the cylindrical part ISA of the pressed frit 15 is fitted into the recess 14B. After that, the pressed frit 15 joined to the ventilation duct 14 is hermetically sealed to the back glass substrate 12. For this reason, the running of the frit paste which melts when the pressed frit 15 is heated is definitely prevented.

However, even if a ring-shaped pressed frit is sandwiched between a flat plate-shaped flange and the back glass substrate 12 without the formation of the recess in the flange 14A of the ventilation duct 14, the flange of the ventilation duct can provide the required effect of preventing the running of the frit paste when the pressed frit 15 is heated.

In the manufacturing process of the flat display panel, the pressed frit 15 and the ventilation duct 14 may be individually placed sequentially in the predetermined position on the underside face of the back glass substrate 12. However, for achieving a reliable positioning between the pressed frit 15 and the ventilation duct 14 and a simplification of the manufacturing process, the pressed frit 15 pre-formed in the predetermined shape desirably is fitted into the flange 14A of the ventilation duct 14, and then the resulting ventilation duct 14 combined with the pressed frit 15 is placed in the predetermined position on the underside face of the back glass substrate 12.

As disclosed in the foregoing embodiment, a flat display panel according to the present invention includes a ventilation hole which is formed in a first substrate of two first and second substrates facing each other at a predetermined interval and provides communication between the outside and the space defined between the first and second substrates. The flat display panel has a feature of including a sealing member having a central hole, and a ventilation duct which is connected to the ventilation hole and secured with the sealing member onto an outer face of the first substrate and includes a flange formed at one end of the ventilation duct connected to the first substrate, the sealing member being sandwiched between the flange and the first substrate and fused to both the flange and the first substrate for securing of the ventilation duct to the first substrate.

For the reason that the flat display panel has the configuration as described above, in the manufacturing process of the flat display panel, the panel is supported such that one of the two substrates which has the ventilation hole formed therein for exhausting the air from the space between the two substrates points downward. Then the ventilation duct is hermetically sealed from beneath by the sealing member to the substrate which has the ventilation hole formed therein.

In this situation, the flange formed on the ventilation duct prevents the sealing member melted by the heating from running downward.

For the prevention of the downward running of the sealing member when being heated, conventionally, the panel is supported such that the substrate having the ventilation hole points upward, in order for the ventilation duct to be attached to the substrate from above. However, the present invention allows the attachment of the ventilation duct from beneath while the panel is supported with the substrate, having the ventilation hole, facing downward.

The formation of the ventilation hole in a back substrate of two substrates constituting of the flat display panel, the back substrate constituting the rear part of the panel, makes it possible to attach the ventilation duct while the panel with the back substrate facing downward is supported. This eliminates the conventional problem of producing scratches or stains on the front substrate as a result of supporting the panel such that the front substrate serving as the display screen for images points downward.

As in the case of the disclosure in the above embodiment, a method of manufacturing flat display panels according to the present invention has a feature of including the steps of: horizontally supporting the panel, including two substrates opposite each other at a required interval, with one of the substrates facing downward, the downward-facing substrate having a ventilation hole which is formed therein to provide communication between the exterior and the space defined between the two substrates; preparing a ventilation duct having a flange formed at one end, and a sealing member having a central hole; placing the sealing member in a position connecting the central hole to the ventilation hole opening on the underside of the substrate, to sandwich the sealing member between the flange and the underside of the substrate, and to align the ventilation duct approximately coaxially with the ventilation hole; and heating the sealing member sandwiched between the flange of the ventilation duct and the underside of the substrate to fuse the flange of the ventilation duct to the underside of the substrate for securing the ventilation duct to the underside of the substrate.

With the method of manufacturing the flat display panels, the panel is supported such that one of the two substrates having the ventilation hole formed therein points downward. Then the ventilation duct is hermetically sealed from beneath by the sealing member to the substrate having the ventilation hole formed therein. At this point, the flange formed on the ventilation duct prevents the sealing member melted by the heating from running downward. Due to this prevention, there is an elimination of the possibility that the melting sealing member will run downward to adhere other unrelated parts, and that the sealing member will be significantly deformed so as to impair the sealing capability between the substrate and the ventilation duct.

For the prevention of the downward running of the sealing member when being heated, conventionally, the panel is supported such that the substrate having the ventilation hole points upward, in order for the ventilation duct to be attached to the substrate from above. However, the present invention allows the attachment of the ventilation duct to the substrate from beneath.

The formation of the ventilation hole in a back substrate of two substrates constituting of the flat display panel, forming the rear part of the panel, makes it possible to attach the ventilation duct while the panel with the back substrate facing downward is supported. This eliminates the conventional problem of producing scratches or stains on the front substrate as a result of supporting the panel such that the front substrate serving as the display screen for images points downward.

The terms and description used herein are set forth by way of illustration only and are not meant as limitations. Those skilled in the art will recognize that numerous variations are possible within the spirit and scope of the invention as defined in the following claims.

What is claimed is:

1. A flat display panel including a ventilation hole which is formed in a first substrate of two first and second substrates facing each other at a predetermined interval and provides communication between the space defined between the first and second substrates and the outside, comprising:

a sealing member having a central hole; and a ventilation duct connected to the ventilation hole and secured with the sealing member onto an outer face of the first substrate, and including a flange formed at one end of the ventilation duct connected to the first substrate, wherein the sealing member is substantially enclose by the flange and the first substrate and is fused to both the flange and the first substrate to secure the ventilation duct to the first substrate.

2. A flat display panel according to claim 1, wherein said ventilation duct further includes a recess formed in a face of the flange opposite to the first substrate, and said sealing member is fitted into the recess in the flange of the ventilation duct and fused to both the flange and the first substrate.

3. A flat display panel according to claim 2, wherein said sealing member is formed in a shape having a cylindrical part fitted into the recess of the flange, and a flange formed at one end of the cylindrical part close to the first substrate.

4. A method of manufacturing flat display panels, comprising the steps of:

horizontally supporting the panel, including two substrates facing each other at a required interval, with one of the substrates, having a ventilation hole formed therein to provide communication between the exterior and a space defined between the two substrates, facing downward;

preparing a ventilation duct having a flange formed at one end, and a sealing member having a central hole;

placing the sealing member in a position connecting the central hole with the ventilation hole opening on the underside of the substrate to sandwich the sealing member between the flange and the underside of the substrate and to align the ventilation duct approximately coaxially with the ventilation hole; and heating the sealing member sandwiched between the flange of the ventilation duct and the underside of the substrate to fuse the sealing member to the flange of the ventilation duct and the underside of the substrate for securing the ventilation duct to the underside of the substrate.

5. A method of manufacturing flat display panels according to claim 4, wherein a recess is formed in a face of the flange of the ventilation duct opposite to the substrate, and the sealing member is fitted into the recess formed in the flange and then comes in contact with the underside face of the substrate.

* * * * *